US011015453B2

United States Patent
Smith et al.

(10) Patent No.: US 11,015,453 B2
(45) Date of Patent: May 25, 2021

(54) ENGINE COMPONENT WITH NON-DIFFUSING SECTION

(71) Applicant: GENERAL ELECTRIC COMPANY, Schenectady, NY (US)

(72) Inventors: Aaron Ezekiel Smith, Hermosa Beach, CA (US); Matthew Thomas Beyer, Hartland, WI (US); Gregory Terrence Garay, West Chester, OH (US); Zachary Daniel Webster, Mason, OH (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 15/820,568

(22) Filed: Nov. 22, 2017

(65) Prior Publication Data

US 2019/0153873 A1 May 23, 2019

(51) Int. Cl.
| | |
|---|---|
| *F01D 5/18* | (2006.01) |
| *F01D 5/20* | (2006.01) |
| *F01D 9/04* | (2006.01) |
| *F01D 25/12* | (2006.01) |
| *F04D 29/32* | (2006.01) |
| *F04D 29/58* | (2006.01) |
| *F04D 29/54* | (2006.01) |
| *F02C 3/04* | (2006.01) |
| *F02C 7/18* | (2006.01) |

(52) U.S. Cl.
CPC .............. *F01D 5/187* (2013.01); *F01D 5/20* (2013.01); *F01D 9/041* (2013.01); *F01D 25/12* (2013.01); *F04D 29/324* (2013.01); *F04D 29/542* (2013.01); *F04D 29/582* (2013.01); *F02C 3/04* (2013.01); *F02C 7/18* (2013.01); *F05D 2220/32* (2013.01); *F05D 2240/307* (2013.01); *F05D 2250/314* (2013.01); *F05D 2250/324* (2013.01); *F05D 2260/202* (2013.01); *F05D 2260/221* (2013.01)

(58) Field of Classification Search
CPC ........................................................ F01D 5/20
See application file for complete search history.

(56) References Cited

U.S. PATENT DOCUMENTS

| | | | |
|---|---|---|---|
| 6,164,914 A * | 12/2000 | Correia | F01D 5/186 415/115 |
| 6,602,052 B2 | 8/2003 | Liang | |
| 6,971,851 B2 | 12/2005 | Liang | |
| 6,991,430 B2 * | 1/2006 | Stec | F01D 5/141 415/115 |
| 7,192,250 B2 | 3/2007 | Boury et al. | |
| 7,704,047 B2 | 4/2010 | Liang et al. | |
| 7,922,451 B1 | 4/2011 | Liang | |
| 7,997,865 B1 * | 8/2011 | Liang | F01D 5/20 416/92 |
| 8,043,058 B1 | 10/2011 | Liang | |
| 8,066,485 B1 | 11/2011 | Liang | |

(Continued)

*Primary Examiner* — Courtney D Heinle
*Assistant Examiner* — John S Hunter, Jr.
(74) *Attorney, Agent, or Firm* — McGarry Bair PC (57) ABSTRACT

An airfoil for a turbine engine can include an outer wall bounding an interior and extending in a chord-wise direction between a leading edge and a trailing edge, and also extending radially between a root and a tip. A tip rail including at least one tip cooling cavity can project from the tip, and cooling holes can be provided in the tip rail.

26 Claims, 5 Drawing Sheets

(56) References Cited

U.S. PATENT DOCUMENTS

| | | | |
|---|---|---|---|
| 8,366,394 B1 * | 2/2013 | Liang | F01D 5/288 |
| | | | 416/97 R |
| 2016/0265366 A1 * | 9/2016 | Snyder | B22F 7/08 |
| 2017/0138203 A1 | 5/2017 | Jaiswal et al. | |

* cited by examiner

ENGINE COMPONENT WITH NON-DIFFUSING SECTION

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to maximize engine efficiency. It is beneficial to provide cooling measures for components such as airfoils in the high-temperature environment, where such cooling measures can reduce material wear on these components and provide for increased structural stability during engine operation.

BRIEF DESCRIPTION

In one aspect, an airfoil for a turbine engine includes an outer wall bounding an interior and extending axially between a leading edge and a trailing edge to define a chord-wise direction with a chord line, and also extending along a radial line between a root and a tip to define a span-wise direction. A tip rail can project from the tip in the span-wise direction, the tip rail including an exterior surface spaced from an interior surface, at least one cooling passage formed in the interior of the airfoil, at least one cooling cavity provided within the tip rail between the exterior and interior surfaces and fluidly coupled to the at least one cooling passage, and a cooling trench extending in the chord-wise direction in the exterior surface of the tip rail and at least partially defined by first and second cooling holes provided in the tip rail. Each of the first and second cooling holes can include an inlet on the interior surface fluidly coupled to the at least one cooling cavity and an outlet on the exterior surface, where adjacent outlets define at least a portion of the cooling trench.

In another aspect, a turbine engine includes a fan section, compressor section, a combustion section, and a turbine section in axial flow arrangement. At least one of the compressor section and turbine section can have an airfoil including an outer wall bounding an interior and extending axially between a leading edge and a trailing edge to define a chord-wise direction with a chord line, and also extending along a radial line between a root and a tip to define a span-wise direction. A tip rail can project from the tip in the span-wise direction, the tip rail including an exterior surface spaced from an interior surface, at least one cooling passage formed in the interior of the airfoil, at least one cooling cavity provided within the tip rail between the exterior and interior surfaces; and a cooling trench extending in the chord-wise direction in the exterior surface of the tip rail and at least partially defined by first and second cooling holes provided in the tip rail. Each of the first and second cooling holes includes an inlet on the interior surface fluidly coupled to the at least one cooling cavity and an outlet on the exterior surface, where adjacent outlets define at least a portion of the cooling trench.

In yet another aspect, a method of cooling a tip wall of an airfoil in a turbine engine includes emitting cooling air into a trench extending in a chord-wise direction along the tip wall. The trench can be at least partially defined by cooling holes within the tip wall, where the cooling holes include overlapping outlets.

DESCRIPTION OF EMBODIMENTS

The described embodiments of the present disclosure are directed to cooling holes for turbine engine airfoils. For purposes of illustration, the present disclosure will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
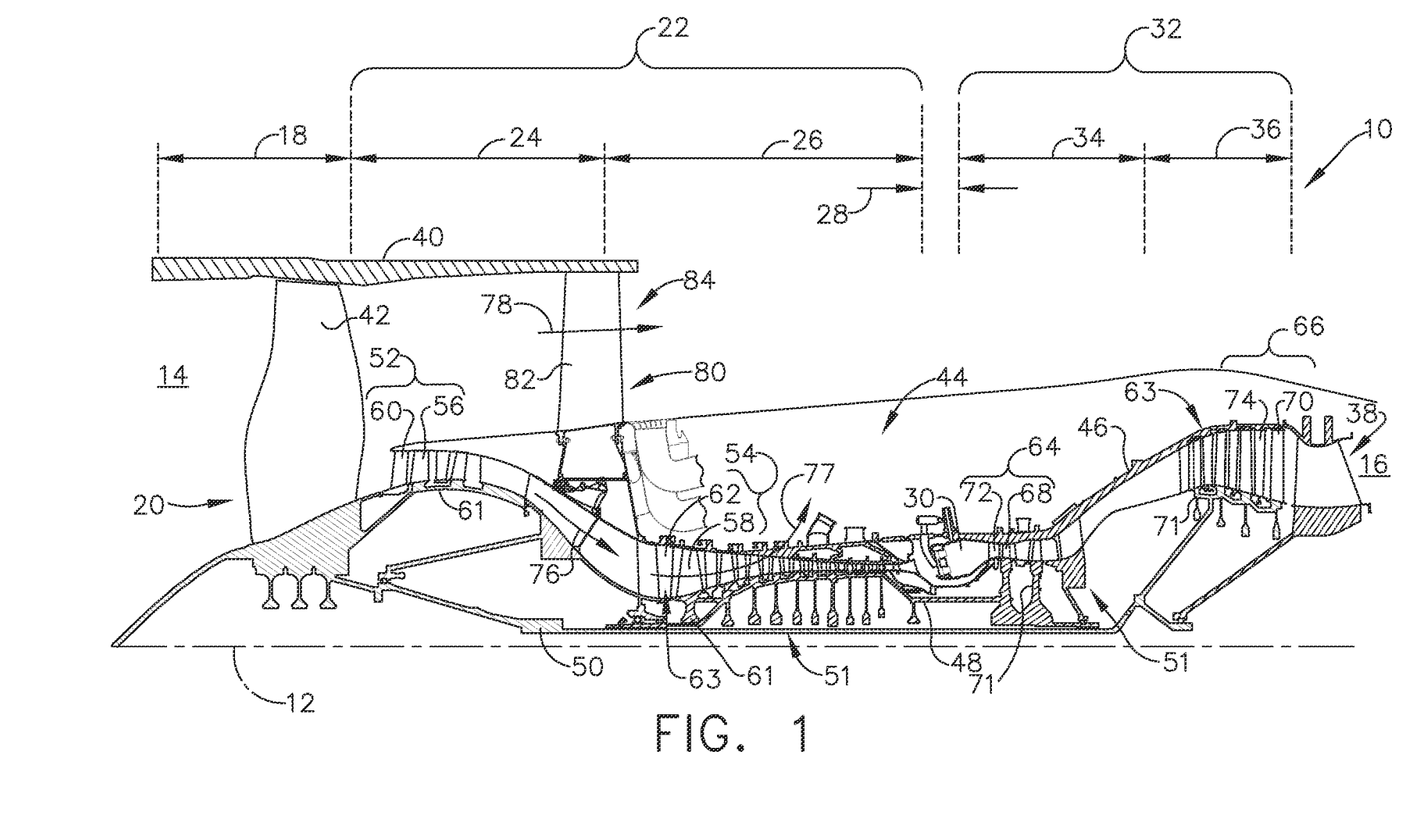
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26.

The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
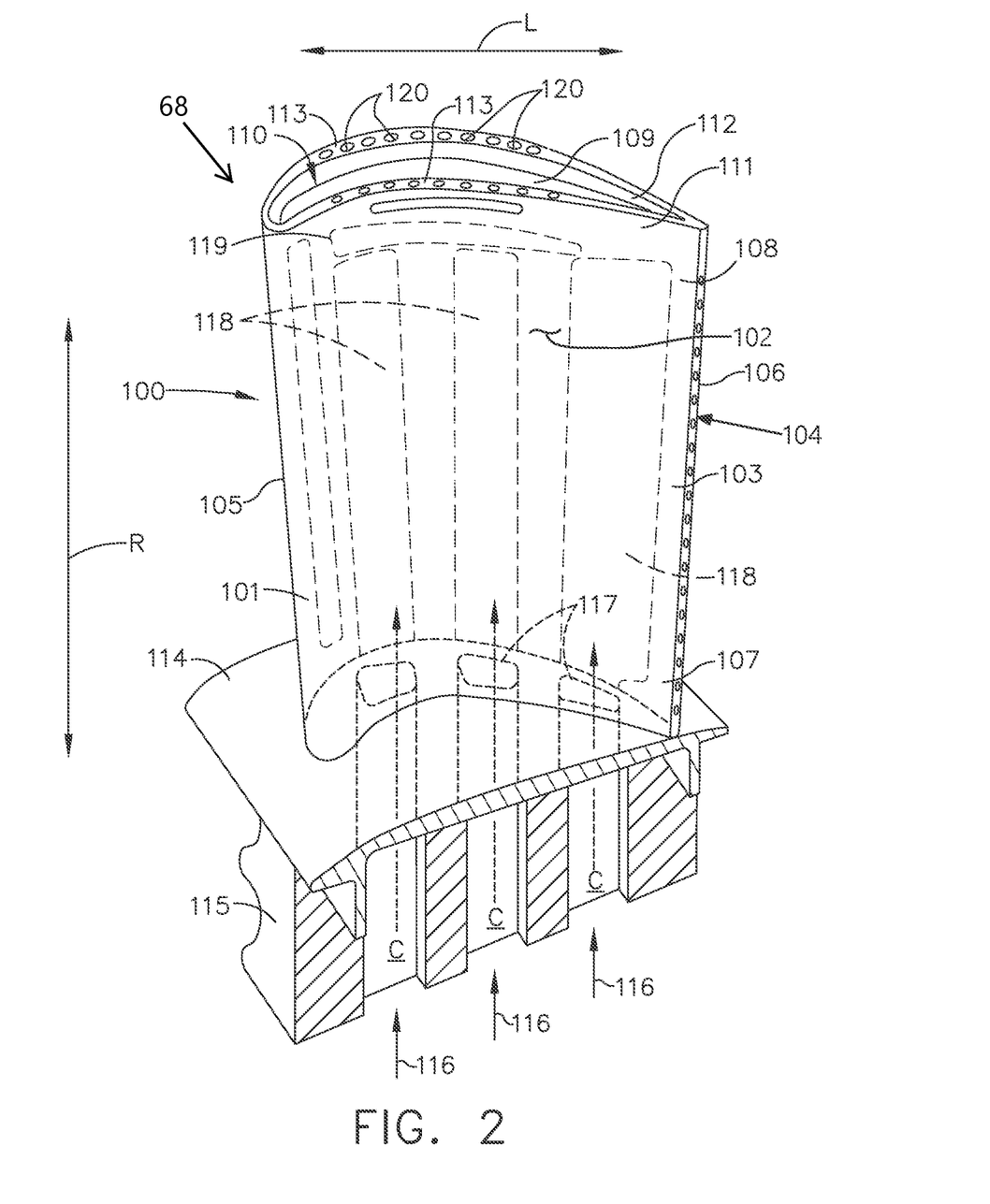
FIG. 2 is an isometric view of an airfoil which can be utilized in the turbine engine of FIG. 1, including cooling holes according to various aspects described herein.

Referring now to FIG. 2, an engine component in the form of one of the turbine blades 68 includes an airfoil 100 extending from a dovetail 115. The airfoil 100 includes an outer wall 101 that bounds an interior 102 and includes a pressure side 103 and a suction side 104. The outer wall 101 extends axially between a leading edge 105 and a trailing edge 106 to define a chord-wise direction indicated by a chord line L, and also extends along a radial line R between a root 107 and a tip 108 to define a span-wise direction. It will be understood that the airfoil 100 can be any rotating or non-rotating airfoil within the turbine engine 10, including in the compressor section 22 or turbine section 32.

The tip 108 can include a tip wall 109 at least partially bounding the airfoil interior 102. A tip rail 110 can project from the tip wall 109 in the span-wise direction as shown; the tip rail 110 can include an exterior surface 111 spaced from an interior surface 112, where an outer edge 113 can connect the exterior and interior surfaces 111, 112. It is contemplated that the tip rail 110 can circumscribe the airfoil 100, and a plurality of cooling holes 120 can be provided in the tip rail 110.

The airfoil 100 can be affixed to the dovetail 115 at the root 107 by way of a platform 114; in one non-limiting example, the dovetail 115 can be configured to mount to the turbine rotor disk 71 on the engine 10 to drive the blade 68. The dovetail 115 is also illustrated herein as having three inlet passages 116 extending through the dovetail 115 and the platform 114. The inlet passages 116 can fluidly couple to the airfoil interior 102 via passage outlets 117. In addition, the airfoil 100 can also include at least one cooling passage 118 formed in the interior 102; the cooling passage 118 can fluidly couple to the passage outlets 117, one or more other cooling passages 118, or other features formed within the airfoil 100 or dovetail 115 as desired.

A tip cooling cavity 119 can be formed within the tip rail 110 between the exterior and interior surfaces 111, 112 and can also be fluidly coupled to the cooling passage 118. In addition, at least one cooling hole 120 can be provided in the tip rail 110 adjacent the pressure side 103 or the suction side 104.

Figure 3:
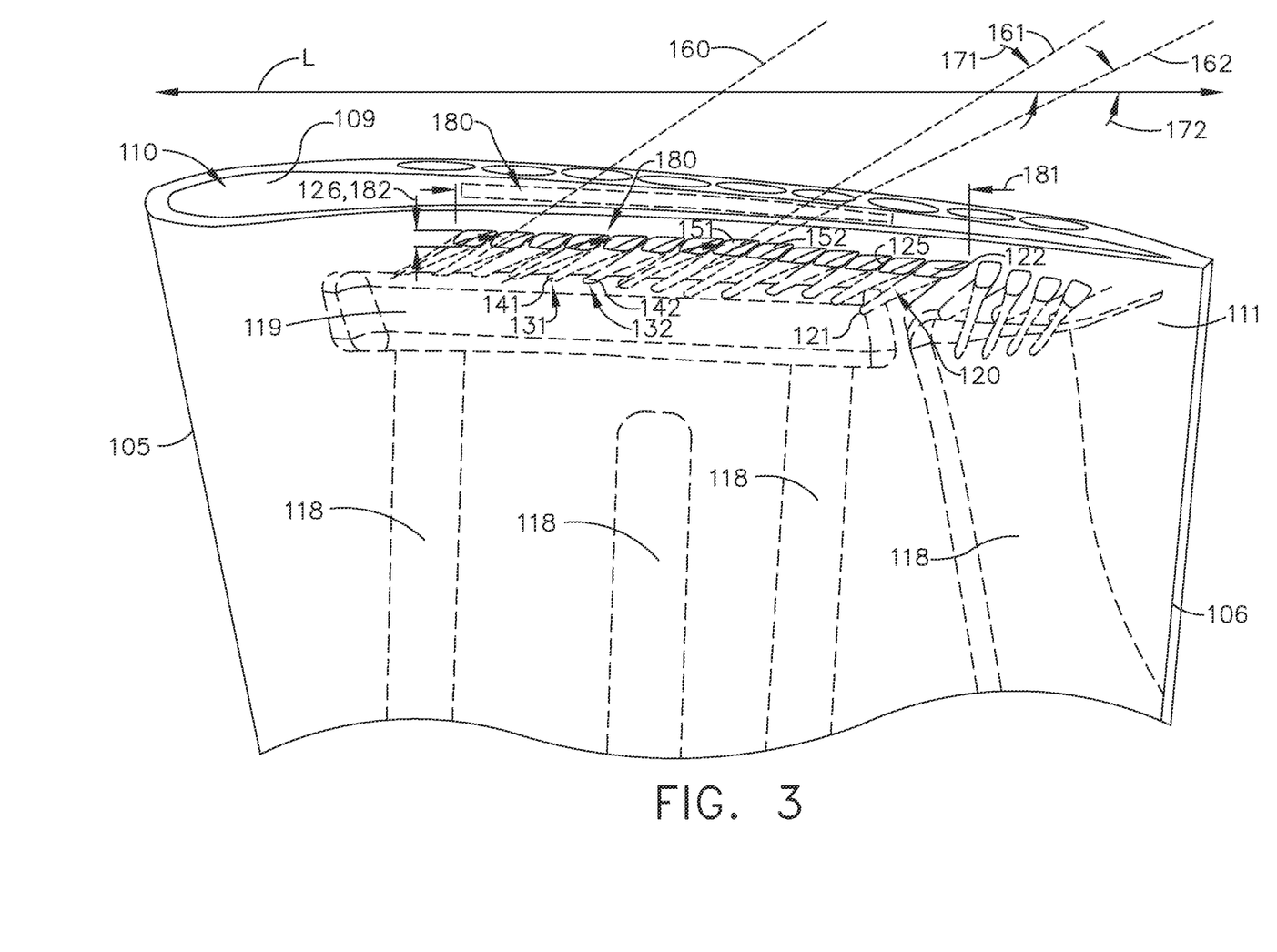
FIG. 3 illustrates the airfoil of FIG. 2 with cooling holes according to a first aspect.

Referring now to FIG. 3, the cooling hole 120 can include an inlet 121 fluidly coupled to the tip cooling cavity 119 and an outlet 122 in the exterior surface 111. It is also contemplated that the outlet 122 can be formed on the outer edge 113 or interior surface 112 of the tip rail 110, and it should be understood that the cooling hole 120 can also be provided in the tip rail 110 adjacent the suction side 104 as well. Furthermore, the inlet 121 and outlet 122 can have any desired shape including round, square, oval, rectangular, rounded rectangular, or an irregular shape as desired.

In one example, a plurality of cooling holes 120 can be formed in the tip rail 110 wherein a first cooling hole 131 is formed adjacent a second cooling hole 132. The first cooling hole 131 has a first inlet 141 in the tip cooling cavity 119 and a first outlet 151 in the exterior surface 111; similarly, the second cooling hole 132 can have a second inlet 142 in the tip cooling cavity 119 and a second outlet 152 in the exterior surface 111.

The first and second cooling holes 131, 132 can define respective first and second centerlines 161, 162 as shown. It is contemplated that either or both of the first and second centerlines 161, 162 can be non-orthogonal to the chord line L, including 50 degrees or smaller in a non-limiting example. In the example of FIG. 3, the first cooling hole 131 forms a first angle 171 with the chord line L and the second cooling hole 132 forms a second angle 172 with the chord line L. The first angle 171 can differ from the second angle 172, and in a non-limiting example both of the first and second angles 171, 172 can be non-orthogonal to the chord line L, for example smaller than 50 degrees. Furthermore, the centerline angle can differ for cooling holes 120 proximate the leading edge 105 as compared to those proximate the trailing edge 106; in one example, the first angle 171 can be greater than the second angle 172, where the first cooling hole 120 is positioned closer to the leading edge 105 while the second cooling hole 132 is positioned closer to the trailing edge 106.

It is further contemplated that a plurality of cooling holes 120 can each have an outlet 122 on the exterior surface 111, where each cooling hole 120 includes a centerline 160 which is non-orthogonal to the chord line L. In one example the centerlines 160 can form angles with the chord line L which generally decrease toward the trailing edge 106, such as that illustrated by the first and second angles 171, 172. In another example the centerlines 160 can form angles with the chord line L which continuously increase at a constant rate toward the trailing edge 106. In still another example, the centerlines 160 can form angles with the chord line L which are non-orthogonal and alternately increase and decrease moving toward the leading edge 105.

Additionally, adjacent outlets 122 of the cooling holes 120 can be positioned axially along the exterior surface 111 and share at least one contact point 125 or at least partially overlap. In this manner the outlets 122 can at least partially define a cooling trench 180 extending in the chord-wise direction in the exterior surface 111. The cooling trench 180 can include a trench width 181 and trench length 182 as shown. It is contemplated that the trench width 181 can be greater than or equal to a maximum cross dimension 126 of the cooling hole outlet 122. In non-limiting examples, the trench width 181 can be smaller than 0.04 cm while the maximum cross dimension 126 can be smaller than 0.005 cm; or the maximum cross dimension 126 of the outlet 122 can be larger than a cross dimension of the inlet 121 (not shown). It is also contemplated that the outlets 122 and cooling trench 180 can also be formed axially along the interior surface 112 or along the outer edge 113 as desired.

In operation, cooling air C (FIG. 2) from within the airfoil interior 102 can flow through the cooling passage 118 and tip cooling cavity 119, entering through the inlet 121 and flowing to the external surface 111 via the cooling trench 180. In another non-limiting example where the cooling trench 180 is positioned on the interior surface 112, cooling air can also flow from the tip cooling cavity 119 to the interior surface 112 via the cooling holes 120 and cooling trench 180. In another non-limiting example the cooling air can flow from the cooling passage 118 directly to the cooling holes 120 and cooling trench 180.

Figure 4:
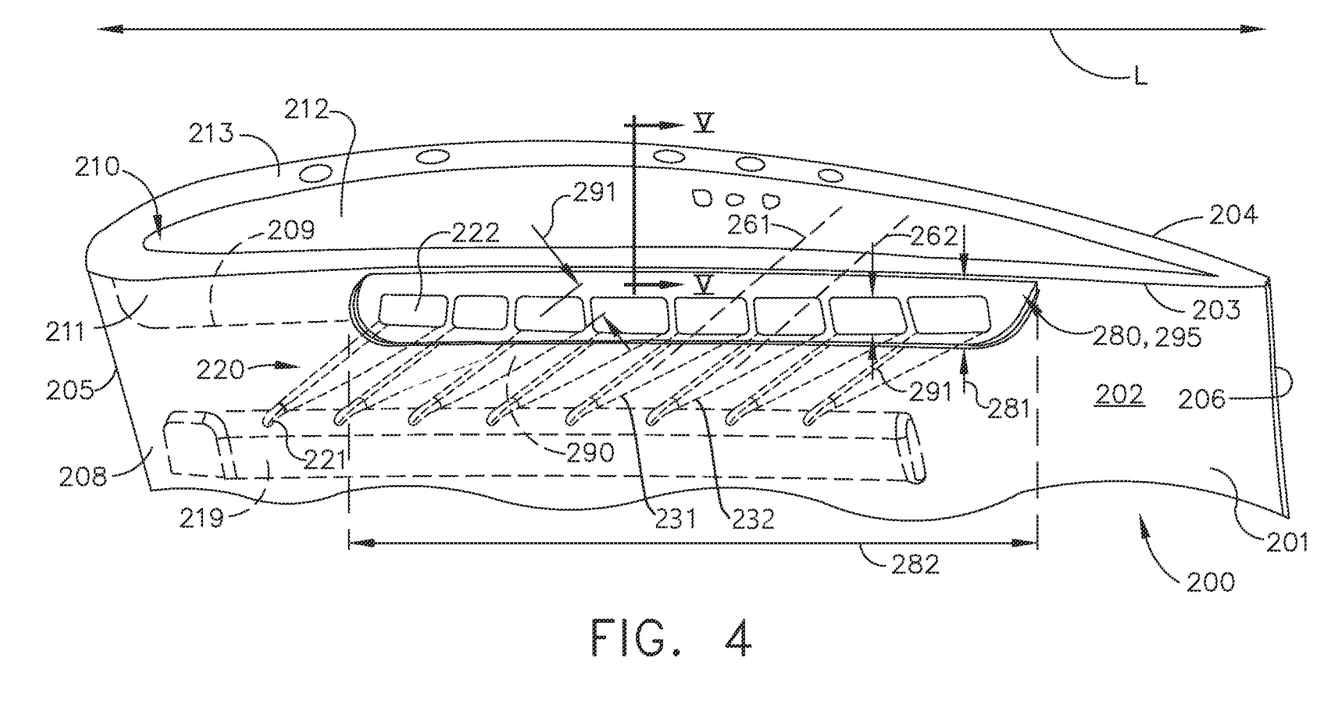
FIG. 4 illustrates the airfoil of FIG. 2 with cooling holes according to a second aspect.

Turning to FIG. 4, another airfoil 200 is illustrated which can be utilized in the turbine engine 10 of FIG. 1. The airfoil 200 is similar to the airfoil 100; therefore, like parts will be identified with like numerals increased by 100, with it being understood that the description of the like parts of the airfoil 100 applies to the airfoil 200, unless otherwise noted.

The airfoil 200 can include an outer wall 201 bounding an interior 202 and having a pressure side 203 and suction side 204. The outer wall can extend along the chord line L between a leading edge 205 and a trailing edge 206 to define a chord-wise direction. A tip 208 of the airfoil 200 can include a tip wall 209; a tip rail 210 can project from the tip wall and include an exterior surface 211 spaced from an interior surface 212, where an outer edge 213 can connect the exterior and interior surfaces 211, 212. The tip rail 210 can also include a tip cooling cavity 219 which can fluidly couple to other cooling passages 218 within the airfoil 200 (shown in FIG. 5).

A set of cooling holes 220 can be formed in the tip rail 210. At least one cooling hole 220 can include an inlet 221 fluidly coupled to the tip cooling cavity 219, and the outlet 222 can include a diffuser 290 fluidly coupled to the airfoil exterior. Additionally, the diffuser 290 can have a variable diffuser diameter 291 as shown. Furthermore, first and second cooling holes 231, 232 can define respective first and second centerlines 261, 262; either or both of which can be non-orthogonal to the chord line L in a similar manner to that of the first and second centerlines 161, 162 of FIG. 3.

The example of FIG. 4 also illustrates that a cooling slot 295 can be provided in the exterior surface 211 of the tip rail 210 and extending in the chord-wise direction, where the outlets 222 of the cooling holes 220 can be fluidly coupled to the cooling slot 295. In this manner the cooling slot 295 can define a cooling trench 280 having a trench width 281 and trench length 282. In one example the trench width 281 can be larger than the diffuser diameter 291.

It is also contemplated in another non-limiting example that adjacent diffusers 290 can abut or overlap to define the cooling trench 280 in a manner similar to the example of FIG. 3. In such a case, the cooling trench 280 can have a trench width 281 equal to that of the diffuser diameter 291, which can form a maximum cross dimension of the outlet 222.

Figure 5:
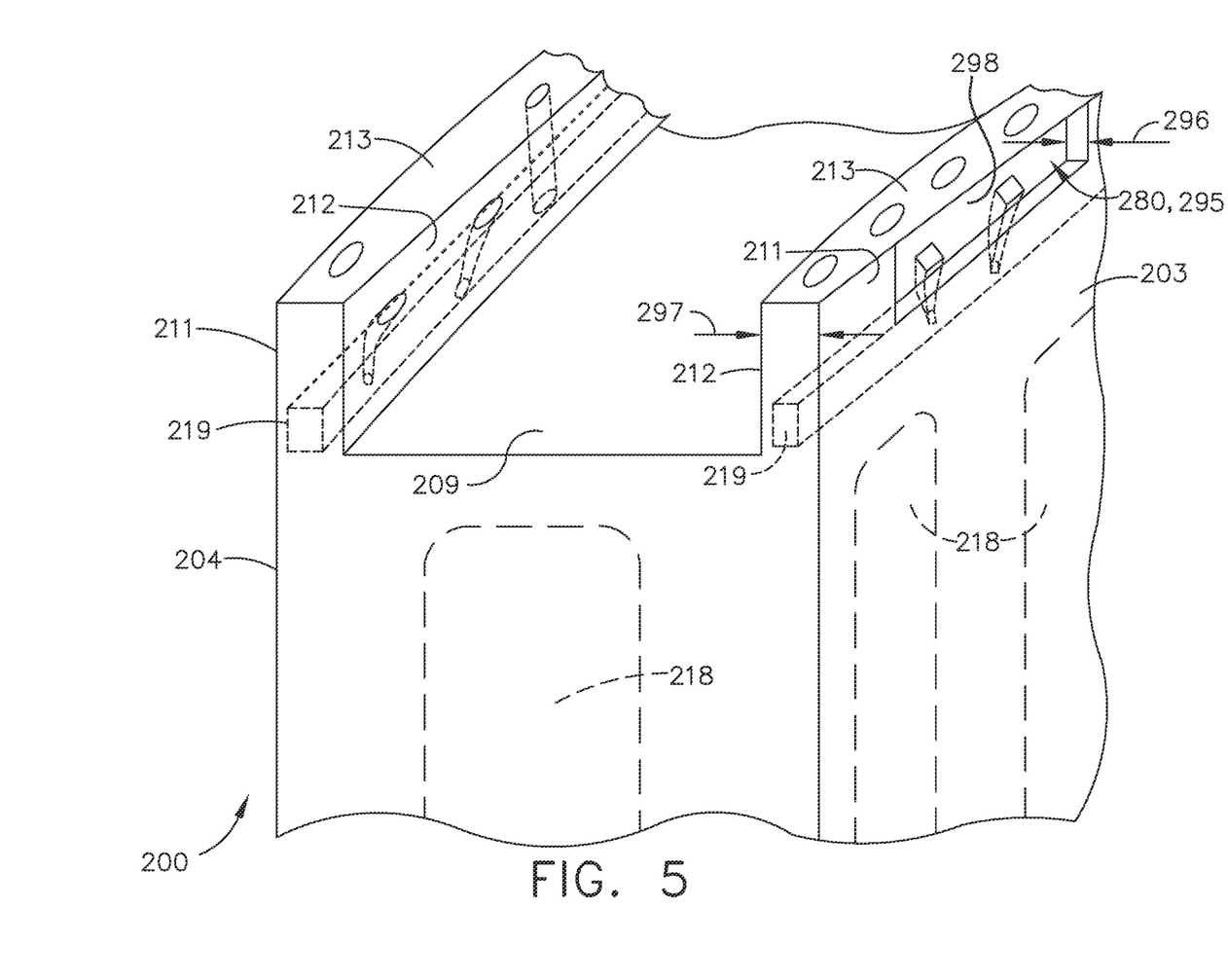
FIG. 5 is a cross-sectional view of the airfoil of FIG. 4 along the line V-V.

FIG. 5 illustrates a cross-sectional view of the airfoil 200 of FIG. 4, where it can be seen that the cooling slot 295 includes a depth 296 less than a thickness 297 of the tip rail 210; in this manner, the cooling slot 295 can be formed with the inner surface 298 in the tip rail 210 as shown. Additionally, at least one cooling hole 220 can have a curvilinear profile between the inlet 221 and outlet 222. Cooling holes 220 are also provided in the tip rail 210 adjacent the suction side 204, where inlets 221 can be fluidly coupled to tip cooling cavities 219, and outlets 222 can be formed on an inner surface 298 of the cooling slot 295, in the interior surface 212, or in the outer edge 213. It is contemplated that any cooling hole described herein can include a centerline which is non-orthogonal to the chord line L. Furthermore, any cooling hole described herein can include a centerline which is non-aligned with the radial line R (FIG. 2).

A method of cooling the tip wall 109 of the airfoil 100 in the turbine engine 10 can include emitting cooling air into the cooling trench 180 extending in the chord-wise direction along the tip wall 109, the trench 180 being at least partially defined by the cooling holes 120 within the tip wall 109 having abutting or overlapping outlets 122. Cooling air can also be supplied via the cooling passage 118 (FIG. 2) fluidly coupled to the tip cooling cavity 119 (FIG. 3), where cooling air can flow from the tip cooling cavity 119 to the cooling holes 120 and cooling trench 180 (FIG. 3).

It can be appreciated that the non-orthogonal angles formed by the cooling hole centerlines with the chord line can allow for better cooling air coverage along the airfoil surface in a direction that improves cooling performance. The non-orthogonal angles can result in longer cooling holes which provide for improved bore cooling and improved diffusion of the cooling air. The cooling holes can be formed with chord-wise or radial angles, and can be linear or curvilinear, and the improved positioning can increase durability or performance of the airfoil by more efficient and directional use of the coolant. Additionally, the cooling trench formed by the cooling hole outlets can further improve cooling performance by keeping cooling air closer to the airfoil surface during operation.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall bounding an interior, and extending axially between a leading edge and a trailing edge to define a chord-wise direction with a chord line, and the outer wall extends along a radial line between a root and a tip to define a span-wise direction;
    a tip rail projecting from the tip in the span-wise direction, the tip rail comprising an exterior surface spaced from an interior surface and at least partially circumscribing the airfoil along the tip;
    at least one cooling passage formed in the interior of the airfoil;
    at least one cooling cavity provided at least partially within the tip rail between the exterior surface and the interior surface and fluidly coupled to the at least one cooling passage; and
    a cooling trench extending in the chord-wise direction in one of the exterior surface or the interior surface of the tip rail, and the cooling trench at least partially defined by a first cooling hole and a second cooling hole provided in the tip rail, with each of the first cooling hole and the second cooling hole fluidly coupling the cooling trench and the at least one cooling cavity.

2. The airfoil of claim 1 wherein at least one of the first cooling hole and the second cooling hole defines a centerline forming a centerline angle that is non-orthogonal relative to the chord line.

3. The airfoil of claim 2 wherein the centerline angle is an acute angle less than 50 degrees.

4. The airfoil of claim 2 wherein both of the first cooling hole and the second cooling hole each define a corresponding centerline forming a corresponding centerline angle that is non-orthogonal relative to the chord line.

5. The airfoil of claim 4 wherein the first cooling hole forms a first centerline angle and the second cooling hole forms a second centerline angle smaller than the first centerline angle.

6. The airfoil of claim 2 further comprising a plurality of cooling holes that includes the first cooling hole and the second cooling hole, where the plurality of cooling holes defines corresponding centerline angles that decrease toward the trailing edge.

7. The airfoil of claim 2 wherein the centerline is non-aligned with the radial line.

8. The airfoil of claim 1 wherein at least one of the first cooling hole or the second cooling hole has a curvilinear profile.

9. The turbine engine of claim 1, wherein the cooling trench is located on the exterior surface of the tip rail, and wherein each of the first cooling hole and the second cooling hole comprises an inlet fluidly coupled to the at least one cooling cavity and an outlet on the exterior surface of the tip rail.

10. The airfoil of claim 9 wherein the outlet of the first cooling hole and the outlet of the second cooling hole are located on an inner surface of a slot formed in the tip rail.

11. The airfoil of claim 9 wherein the outlets share at least one contact point to define the at least a portion of the cooling trench.

12. The airfoil of claim 9 further comprising a first diffuser at the outlet of the first cooling hole and a second diffuser at the outlet of the second cooling hole.

13. The airfoil of claim 9 wherein the outlet of one of the first cooling hole or the second cooling hole comprises a maximum cross dimension, and the cooling trench comprises a trench width larger than the maximum cross dimension.

14. The turbine engine of claim 9 wherein adjacent outlets define at least a portion of the cooling trench.

15. A turbine engine comprising a fan section, compressor section, a combustion section, and a turbine section in axial flow arrangement, with at least one of the compressor section or the turbine section having an airfoil comprising:

an outer wall bounding an interior, and extending axially between a leading edge and a trailing edge to define a chord-wise direction with a chord line, and the outer wall extends along a radial line between a root and a tip to define a span-wise direction;

a tip rail projecting from the tip in the span-wise direction, the tip rail comprising an exterior surface spaced from an interior surface;

at least one cooling passage formed in the interior of the airfoil;

at least one tip cooling cavity provided at least partially within the tip rail between the exterior surface and the interior surface; and a cooling trench extending in the chord-wise direction in the exterior surface of the tip rail, and at least partially defined by a first cooling hole and a second cooling hole provided in the tip rail, each of the first cooling hole and the second cooling hole fluidly coupling the at least one tip cooling cavity and the cooling trench.

16. The turbine engine of claim 15 wherein at least one of the first cooling hole or the second cooling hole defines a centerline forming a non-orthogonal centerline angle relative to the chord line.

17. The turbine engine of claim 16 wherein the non-orthogonal centerline angle is an acute angle less than 50 degrees.

18. The turbine engine of claim 15 wherein the outlet of the first cooling hole and the outlet of the second cooling hole are located on an inner surface of a slot formed in the tip rail.

19. The turbine engine of claim 15 wherein the first cooling hole forms a first centerline angle and the second cooling hole forms a second centerline angle smaller than the first centerline angle.

20. The turbine engine of claim 15, wherein the cooling trench is located on the exterior surface of the tip rail, and wherein each of the first cooling hole and the second cooling hole comprises an inlet fluidly coupled to the at least one cooling cavity and an outlet on the exterior surface of the tip rail.

21. The turbine engine of claim 20 wherein the outlets share at least one contact point to define the at least a portion of the cooling trench.

22. The turbine engine of claim 20 further comprising a first diffuser at the outlet of the first cooling hole and a second diffuser at the outlet of the second cooling hole.

23. The turbine engine of claim 20 wherein the outlet of one of the first cooling hole or the second cooling hole comprises a maximum cross dimension, and the cooling trench comprises a trench width greater than the maximum cross dimension.

24. A method of cooling a tip rail projecting radially outward from a tip of an airfoil in a turbine engine, the method comprising emitting cooling air from a cooling passage at least partially within the tip rail into a trench extending in a chord-wise direction along the tip rail, the trench being at least partially defined by cooling holes within the tip rail having abutting outlets.

25. The method of claim 24 wherein the emitting cooling air further comprises emitting the cooling air from an inner surface of a slot located within the tip rail.

26. The method of claim 24 wherein the emitting cooling air further comprises emitting the cooling air from one of an exterior surface or an interior surface of the tip rail.

* * * * *